US012463727B2

(12) United States Patent
Hubbard et al.

(10) Patent No.: US 12,463,727 B2
(45) Date of Patent: Nov. 4, 2025

(54) TUNABLE OPTICAL FILTER IN COHERENT OPTICAL TRANSMITTERS

(71) Applicant: Ciena Corporation, Hanover, MD (US)

(72) Inventors: Michael Hubbard, Nepean (CA); Will Leckie, Ottawa (CA); Victor Aldea, Nepean (CA); Priyanth Mehta, Nepean (CA)

(73) Assignee: Ciena Corporation, Hanover, MD (US)

( * ) Notice: Subject to any disclaimer, the term of this patent is extended or adjusted under 35 U.S.C. 154(b) by 155 days.

(21) Appl. No.: 17/712,263

(22) Filed: Apr. 4, 2022

(65) Prior Publication Data

US 2023/0318712 A1 Oct. 5, 2023

(51) Int. Cl.
*H04B 10/50* (2013.01)
*H04B 10/61* (2013.01)
*H04B 10/079* (2013.01)
*H04B 10/2507* (2013.01)
*H04J 14/02* (2006.01)

(52) U.S. Cl.
CPC ....... *H04B 10/5051* (2013.01); *H04B 10/615* (2013.01); *H04B 10/616* (2013.01); *H04B 10/07955* (2013.01); *H04B 10/07957* (2013.01); *H04B 10/2507* (2013.01); *H04B 10/25073* (2013.01); *H04B 10/50* (2013.01); *H04J 14/02* (2013.01)

(58) Field of Classification Search
CPC .......... H04B 10/5051; H04B 10/615; H04B 10/616; H04B 10/07955; H04B 10/07957; H04B 10/2507; H04B 10/25073; H04B 10/50; H04J 14/02; H04J 14/0305

USPC ........ 398/9–38, 43–103, 140–172, 182–201
See application file for complete search history.

(56) References Cited

U.S. PATENT DOCUMENTS

| 5,357,364 A * | 10/1994 | Gordon | H04B 10/25077 398/80 |
| 5,396,359 A * | 3/1995 | Abramovitz | H04J 14/0241 398/58 |
| 5,523,874 A * | 6/1996 | Epworth | H04B 10/25077 398/28 |
| 6,912,343 B1 * | 6/2005 | Chen | G02B 6/30 385/30 |

(Continued)

OTHER PUBLICATIONS

Integrated, HarperCollins Compact Dictionary & Thesaurus 401 (2003).*

(Continued)

*Primary Examiner* — Dibson J Sanchez
(74) *Attorney, Agent, or Firm* — Baratta Law PLLC; Lawrence A. Baratta, Jr.

(57) ABSTRACT

A coherent optical transmitter includes circuitry connected to a coherent modulator; and a plurality of tunable optical filters (TOFs) connected to one another and connected to an output of the coherent modulator, wherein the plurality of tunable optical filters are configurable to create an effective transfer function having a variable width. The TOFs are cascaded and can be included in discrete form on electro-optic printed circuit boards (PCBs), or integrated in various electro-optic material systems such as in silicon photonics, photonic integrated circuits (PICs), as well as hybrid and other approaches. The advantage of this approach includes improved OSNR in colorless transmitters.

20 Claims, 11 Drawing Sheets

(56) References Cited

U.S. PATENT DOCUMENTS

| | | | | |
|---|---|---|---|---|
| 7,974,534 | B2* | 7/2011 | Weiner | H04B 10/00 |
| | | | | 398/198 |
| 8,320,760 | B1* | 11/2012 | Lam | H04J 14/0282 |
| | | | | 398/68 |
| 8,867,913 | B2 | 10/2014 | Gareau et al. | |
| 9,628,189 | B2 | 4/2017 | Châtelain et al. | |
| 9,685,762 | B1* | 6/2017 | Norberg | H01S 5/5027 |
| 10,062,993 | B1 | 8/2018 | Lutkiewicz et al. | |
| 10,256,935 | B1* | 4/2019 | Kumar | H04L 1/0003 |
| 10,509,180 | B2 | 12/2019 | Meunier et al. | |
| 10,638,631 | B2 | 4/2020 | O'Leary et al. | |
| 10,782,492 | B2 | 9/2020 | Meunier et al. | |
| 11,082,157 | B2 | 8/2021 | Shiner et al. | |
| 2003/0095737 | A1* | 5/2003 | Welch | B82Y 20/00 |
| | | | | 385/14 |
| 2003/0123129 | A1* | 7/2003 | Nakazawa | H04J 14/021 |
| | | | | 359/308 |
| 2003/0123774 | A1* | 7/2003 | Nakazawa | G02F 1/116 |
| | | | | 385/39 |
| 2003/0133649 | A1* | 7/2003 | Hakimi | G02B 6/29394 |
| | | | | 385/24 |
| 2003/0133650 | A1* | 7/2003 | Hakimi | G02B 6/29317 |
| | | | | 385/27 |
| 2003/0133651 | A1* | 7/2003 | Hakimi | H04B 10/291 |
| | | | | 385/27 |
| 2003/0156779 | A1* | 8/2003 | Wang | G02B 6/12021 |
| | | | | 385/140 |
| 2003/0161631 | A1* | 8/2003 | Margalit | H04B 10/077 |
| | | | | 398/33 |
| 2004/0131309 | A1 | 7/2004 | Zhang et al. | |
| 2004/0161242 | A1* | 8/2004 | Xu | H04B 10/077 |
| | | | | 398/149 |
| 2004/0202473 | A1* | 10/2004 | Nakamura | H04J 14/02 |
| | | | | 398/85 |
| 2005/0175339 | A1* | 8/2005 | Herskowits | H04B 10/2543 |
| | | | | 398/1 |
| 2005/0201754 | A1* | 9/2005 | Fujita | H04B 10/291 |
| | | | | 398/85 |
| 2005/0213879 | A1* | 9/2005 | Wang | G02B 6/29395 |
| | | | | 385/24 |
| 2007/0258714 | A1* | 11/2007 | Little | G02B 6/2938 |
| | | | | 398/76 |
| 2009/0214223 | A1* | 8/2009 | Chen | H04B 10/00 |
| | | | | 398/183 |
| 2014/0079401 | A1* | 3/2014 | Lee | H04J 14/0305 |
| | | | | 398/81 |
| 2016/0066466 | A1 | 3/2016 | Aldea et al. | |
| 2016/0226616 | A1* | 8/2016 | Jeong | H04B 10/291 |
| 2017/0093515 | A1* | 3/2017 | Tanaka | H04J 14/02216 |
| 2017/0346591 | A1* | 11/2017 | Chedore | H04Q 11/0005 |
| 2018/0059328 | A1* | 3/2018 | Shi | G02B 6/29382 |
| 2020/0067624 | A1* | 2/2020 | Tsuzuki | H04Q 11/0066 |
| 2020/0271877 | A1 | 8/2020 | Maniloff et al. | |
| 2021/0084746 | A1 | 3/2021 | O'Leary et al. | |
| 2021/0320724 | A1* | 10/2021 | Geyer | H04B 10/616 |
| 2022/0070044 | A1 | 3/2022 | Vaquero-Caballero et al. | |
| 2022/0294534 | A1* | 9/2022 | Tomioka | H04B 10/697 |
| 2023/0045731 | A1* | 2/2023 | Shukunami | H04B 10/40 |

OTHER PUBLICATIONS

Li Liu et al., "Bandwidth and Wavelength Tunable All-Optical Filter Based on Cascaded Opto-Mechanical Microring Resonators," IEEE Photonics Journal, vol. 11, No. 1, Feb. 2019, 11 Pages.

Tai-Chun Wang et al., "Bandwidth-and wavelength-tunable optical filter based on cascaded waveguide gratings on silicon-on-insulator," 2020 Conference on Lasers and Electro-Optics (CLEO), OSA, May 10, 2020, 1 Page.

Jul. 19, 2023. International Search Report and Written Opinion for International Patent Application No. PCT/US2023/017399.

* cited by examiner

TUNABLE OPTICAL FILTER IN COHERENT OPTICAL TRANSMITTERS

FIELD OF THE DISCLOSURE

The present disclosure generally relates to optical networking. More particularly, the present disclosure relates to systems and methods for a bandwidth tunable optical filter (TOF) in coherent optical transmitters.

BACKGROUND OF THE DISCLOSURE

The transmit optical signal-to-noise ratio (OSNR) from any network element (NE) terminal can be a significant factor for network operators who set high performance standards for colorless configurations, particularly in submarine line terminal equipment (SLTE) to achieve the highest spectrally efficient transmission mode from the transmitter, transceiver, transponder, modem, etc. (of note, all of these include an optical transmitter, and are contemplated herein). Terminal OSNR penalties include line amplifier noise figure contributions, inter-channel crosstalk, and noise funneling from colorless multiplexer structures. Noise funneling refers to noise being added when multiple signals are multiplexed together via multiplexer structures. For example, noise pedestals outside the signal bandwidth of one signal can contribute to noise in another signal.

For the noise funneling, current modem optical filtering schemes include a TOF in the transmitter having a tunable center frequency but a static bandwidth (full width at half maximum (FWHM)). A static bandwidth filter provides some benefit to the noise funneling, namely filtering out of band spectrum, and its center frequency can be optimized, but such filters are not bandwidth tunable, in terms of the passband, in the optical domain. The inventors are aware of no known prior solutions for tunable bandwidth filtering of an optical signal in a coherent transmitter.

BRIEF SUMMARY OF THE DISCLOSURE

The present disclosure relates to systems and methods for a bandwidth tunable optical filter (TOF) in coherent optical transmitters. In particular, the present disclosure includes TOFs on a transmitter that provides tunable bandwidth filtering in the optical domain. The TOFs are cascaded and can be included in discrete form on electro-optic printed circuit boards (PCBs), or integrated in various electro-optic material systems such as in silicon photonics, photonic integrated circuits (PICs), as well as hybrid and other approaches. The advantage of this approach includes improved OSNR in colorless transmitters.

In an embodiment, a coherent optical transmitter includes a coherent modulator; and a plurality of tunable optical filters connected to an output of the coherent modulator, wherein the plurality of tunable optical filters are configurable to create an effective transfer function having a variable width and center frequency. The plurality of tunable optical filters can be cascaded with one another. The plurality of tunable optical filters can be configured together as an integrated device. The integrated device can further include the coherent modulator. The coherent optical transmitter can further include an optical amplifier located between the coherent modulator and the plurality of tunable optical filters.

Each of the plurality of tunable optical filters can include a fixed width and tunable center frequencies. The effective transfer function can be based on setting of the tunable center frequencies. A passband of the effective transfer function can be based on frequency offsets and Full Width at Half Maximum (FWHM) of the plurality of tunable optical filters. One or more of the plurality of tunable optical filters can have a shape that includes any of a raised cosine shape and any order Gaussians. One or more of the plurality of tunable optical filters can be based on Microelectromechanical systems (MEMS).

The coherent optical transmitter can further include one or more photodetectors for monitoring and configuration of the plurality of tunable optical filters. The one or more photodetectors can include a photodetector between the plurality of tunable optical filters. The plurality of tunable optical filters can be controlled based on total output power. The plurality of tunable optical filters can be controlled sequentially. The plurality of tunable optical filters can be configured based on spectral width of an output signal from the coherent modulator.

In another embodiment, a method implemented in a coherent transmitter includes steps of receiving an optical signal that was coherent modulated via a coherent modulator; and configuring a plurality of tunable optical filters, which are connected to an output of the coherent modulator, to create an effective transfer function having a variable width and center frequency based on the received optical signal.

The steps can include monitoring optical power via one or more photodetectors for the configuring of the plurality of tunable optical filters. Each of the plurality of tunable optical filters can include a fixed width and tunable center frequencies. The effective transfer function can be based on setting the tunable center frequencies. The steps can include amplifying a signal from the coherent modulator before, in between, or after any of the plurality of tunable optical filters.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a bandwidth tunable optical filter (TOF) in coherent optical transmitters. In particular, the present disclosure includes TOFs on a transmitter that provides tunable bandwidth filtering in the optical domain. The TOFs are cascaded and can be included in discrete form on electro-optic printed circuit boards (PCBs), or integrated in various electro-optic material systems such as in silicon photonics, photonic integrated circuits (PICs), as well as hybrid and other approaches. The advantage of this approach includes improved OSNR in colorless transmitters.

Coherent Transmitter with a Single TOF

Figure 1:
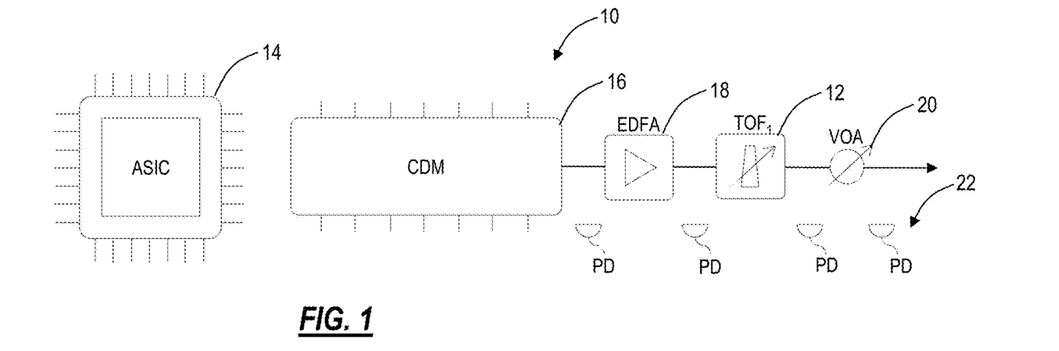
FIG. 1 is a block diagram of example components in a coherent transmitter with a single TOF.

FIG. 1 is a block diagram of example components in a coherent transmitter 10 with a single TOF 12. In this example, there is an application specific integrated circuit (ASIC) 14 that is configured to provided digital functions, including digital signal processing (DSP) functions. A coherent driver modulator (CDM) 16 interfaces the ASIC 14 and is configured to provide a coherently modulated optical signal output which is amplified by an amplifier 18, such as an erbium doped fiber amplifier (EDFA), and which is filtered by the TOF 12 and potentially attenuated via a variable optical attenuator (VOA) 20. Further, there can be various photodetectors (PD) 22 along the transmitter 10 for monitoring power levels, such as via taps.

Those skilled in the art will recognize a practical embodiment of the coherent transmitter 10 can include various other components which are omitted for simplicity. Also, of note, FIG. 1 is shown with discrete components for example only. Those skilled in the art will recognize these various functional components can be realized in an integrated manner, such as in silicon photonics, photonic integrated circuits (PICs), as well as hybrid and other approaches.

Figure 2:
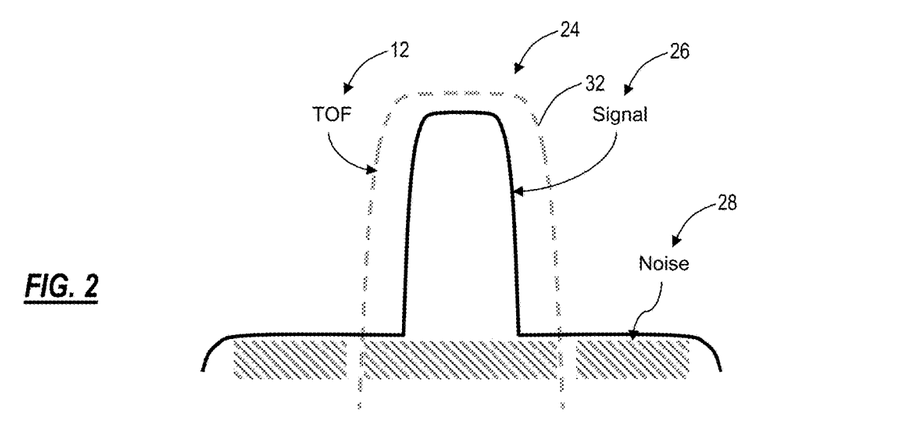
FIG. 2 is a spectral diagram of a single channel having signal components and noise components and filtered by the TOF.

Again, terminal OSNR penalties are composed from line amp noise figure contributions, inter-channel crosstalk, and noise funneling from colorless mux structures. The latter penalty is reduced using the TOF 12 on the front end of a coherent transmitter as shown in FIG. 2. This TOF 12 is controlled and centered based on the photodetectors (PD) readings pre- and post-TOF 12.

Figure 3:
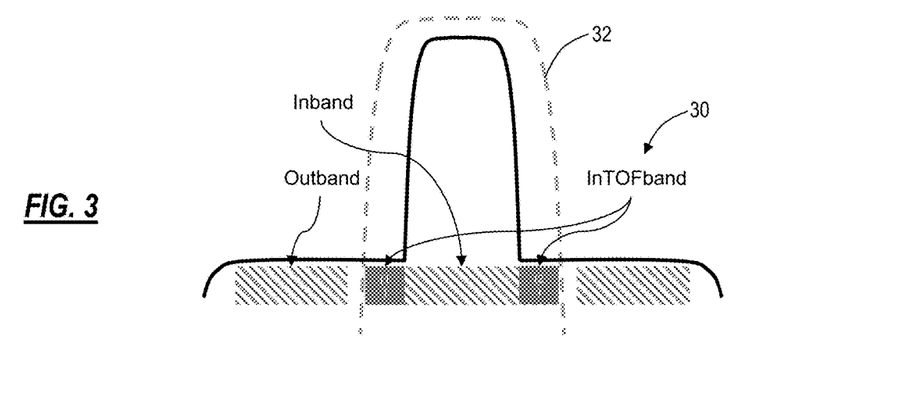
FIG. 3 is a spectral diagram of the single channel illustrating noise pedestals located inband of the TOF and contributing to noise funneling.

FIG. 2 is a spectral diagram of a single channel 24 having signal components 26 and noise components 28 and filtered by the TOF 12. FIG. 3 is a spectral diagram of the single channel 24 illustrating noise pedestals 30 located inband of the TOF 12 and contributing to noise funneling. The TOF 12 is center frequency tunable, meaning a filter shape 32 can be moved, but the overall shape and optical bandwidth is fixed.

Figure 4:
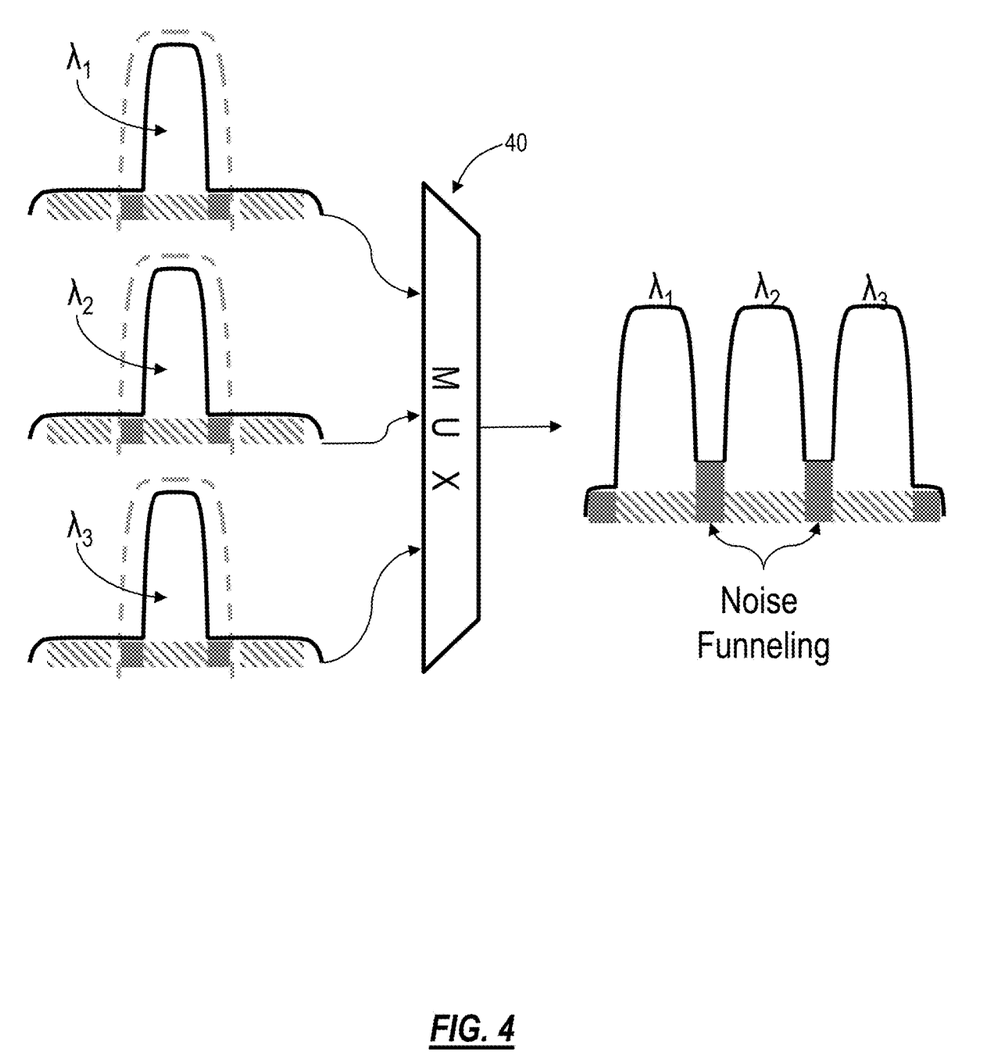
FIG. 4 is a diagram illustrating three example optical signals $\lambda_1$, $\lambda_2$, $\lambda_3$ being multiplexed by a multiplexer to illustrate noise funneling.

In variable- or tunable-baud modems, as the signal gets narrower, the total inband noise power increases, because the TOF 12 bandwidth is fixed, thereby diminishing the transmit OSNR further after colorless multiplexing. FIG. 4 is a diagram illustrating three example optical signals $\lambda_1, \lambda_2, \lambda_3$ being multiplexed by a multiplexer 40 to illustrate noise funneling. The primary shortcoming of the fixed bandwidth TOF 12 is the increased noise penalty due to noise funneling. FIG. 4 illustrates the increased inter-channel noise power after colorless multiplexing due to the extended bandwidth of the TOF used. This noise penalty increases as the signal baud is reduced (since the TOF bandwidth remains the same).

Bandwidth Tunable TOF System

The present disclosure includes a bandwidth tunable TOF system that minimizes noise funneling penalties in tunable baud modems. The filter design, centering, control, and layout are described herein.

Figure 5:
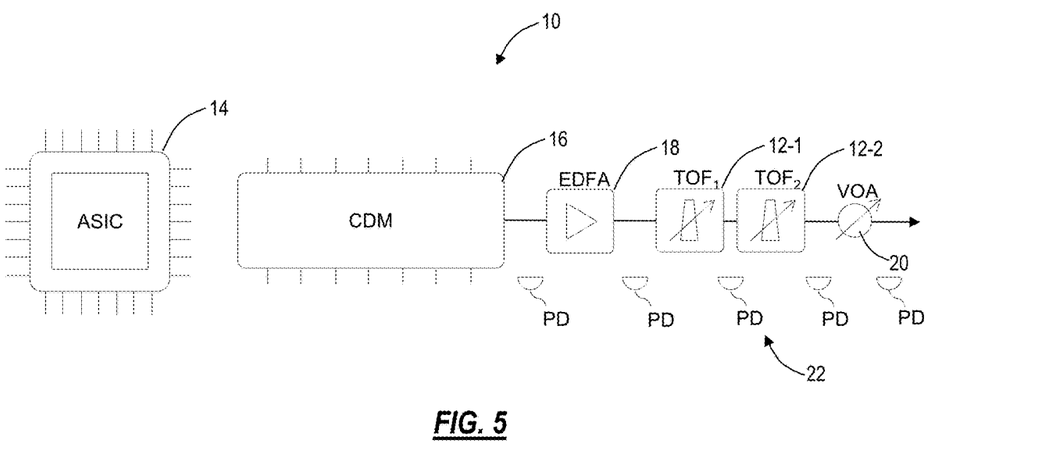
FIG. 5 is a block diagram of example components in a coherent transmitter with a dual TOF.
Figure 6:
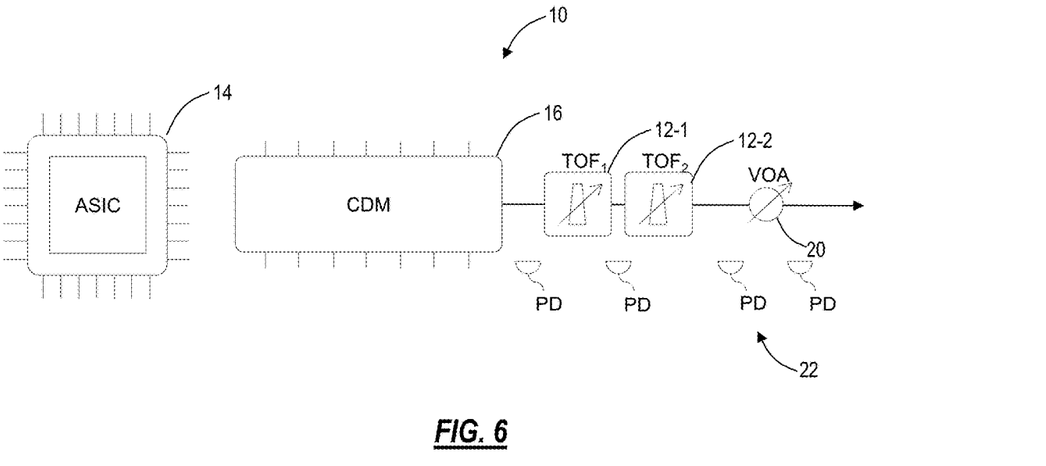
FIG. 6 is a block diagram of example components in a coherent transmitter with a dual TOF in an amp-less configuration.

FIG. 5 is a block diagram of example components in a coherent transmitter 10 with a dual TOF 12-1, 12-2. FIG. 6 is a block diagram of example components in a coherent transmitter 10 with a dual TOF 12-1, 12-2 in an amp-less configuration. These are two example configurations and those skilled in the art will recognize there can be other embodiments as well as more than two TOFs.

Figure 7:
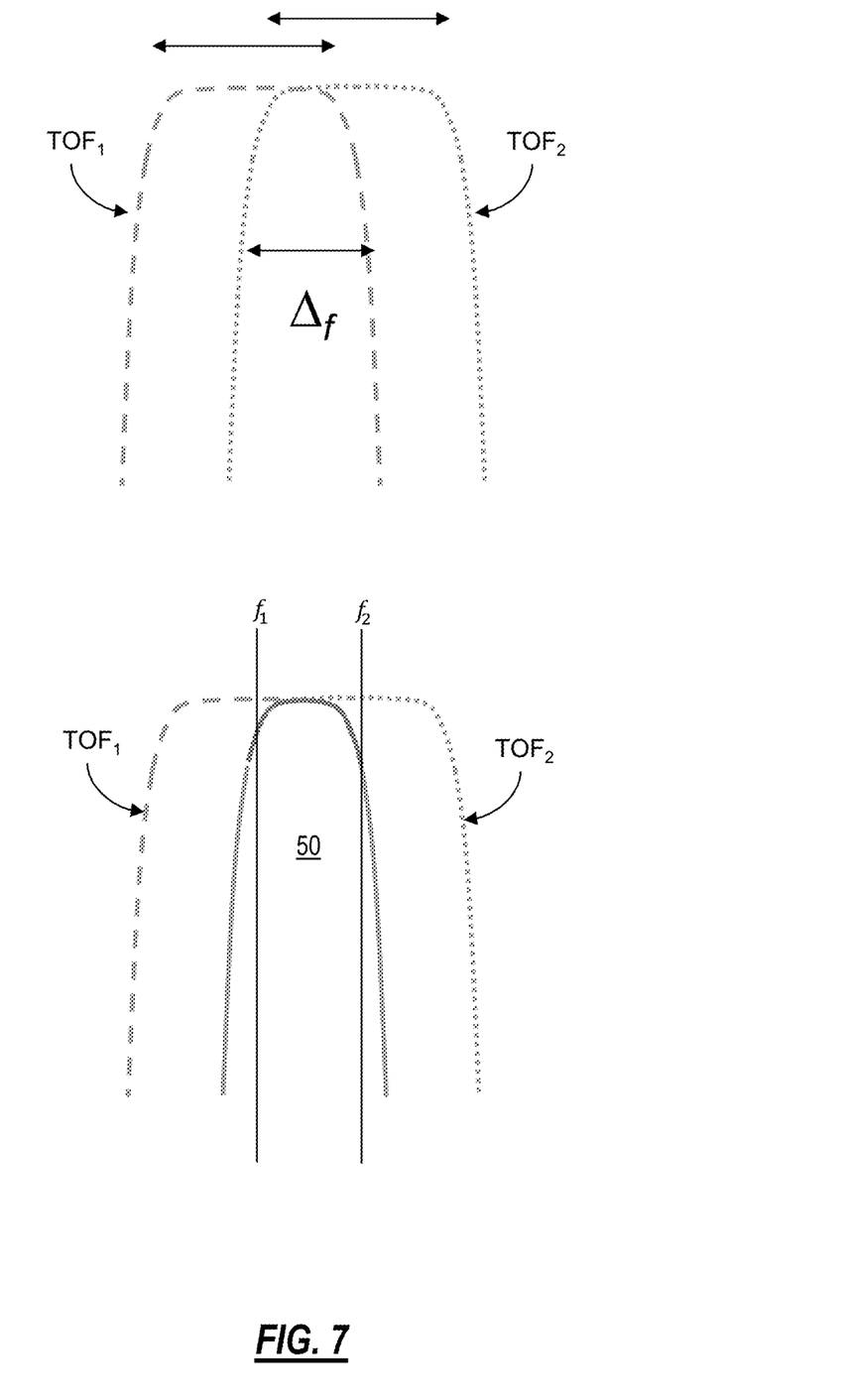
FIG. 7 are spectral diagrams illustrating two filter responses from the TOFs and an effective third filter response based on the center frequencies of the TOFs.

The present disclosures utilizes multiple fixed bandwidth TOFs 12-1, 12-2 that are cascaded with their center frequencies offset from each other. The offset allows the two fixed TOFs 12-1, 12-2 to effectively produce a third filter response, where the bandwidth is dictated by the center frequency offset. FIG. 7 are spectral diagrams illustrating two filter responses from the TOFs 12-1, 12-2 and an effective third filter response 50 based on the center frequencies of the TOFs 12-1, 12-2. Of note, the filter responses of each of the TOFs 12-1, 12-2 have a fixed width, but this can lead to a variable width based on the center frequencies of the TOFs 12-1, 12-2. For example, spreading the center frequencies apart reduces the bandwidth of the filter response 50 whereas bring the center frequencies together increases the bandwidth of the filter response 50, up to the fixed width (or the smaller width) of the TOFs 12-1, 12-2. Also, the solution need not be limited to two TOFs; however, the primary function of bandwidth tunability is easily achieved with a dual TOF configuration.

Figure 8:
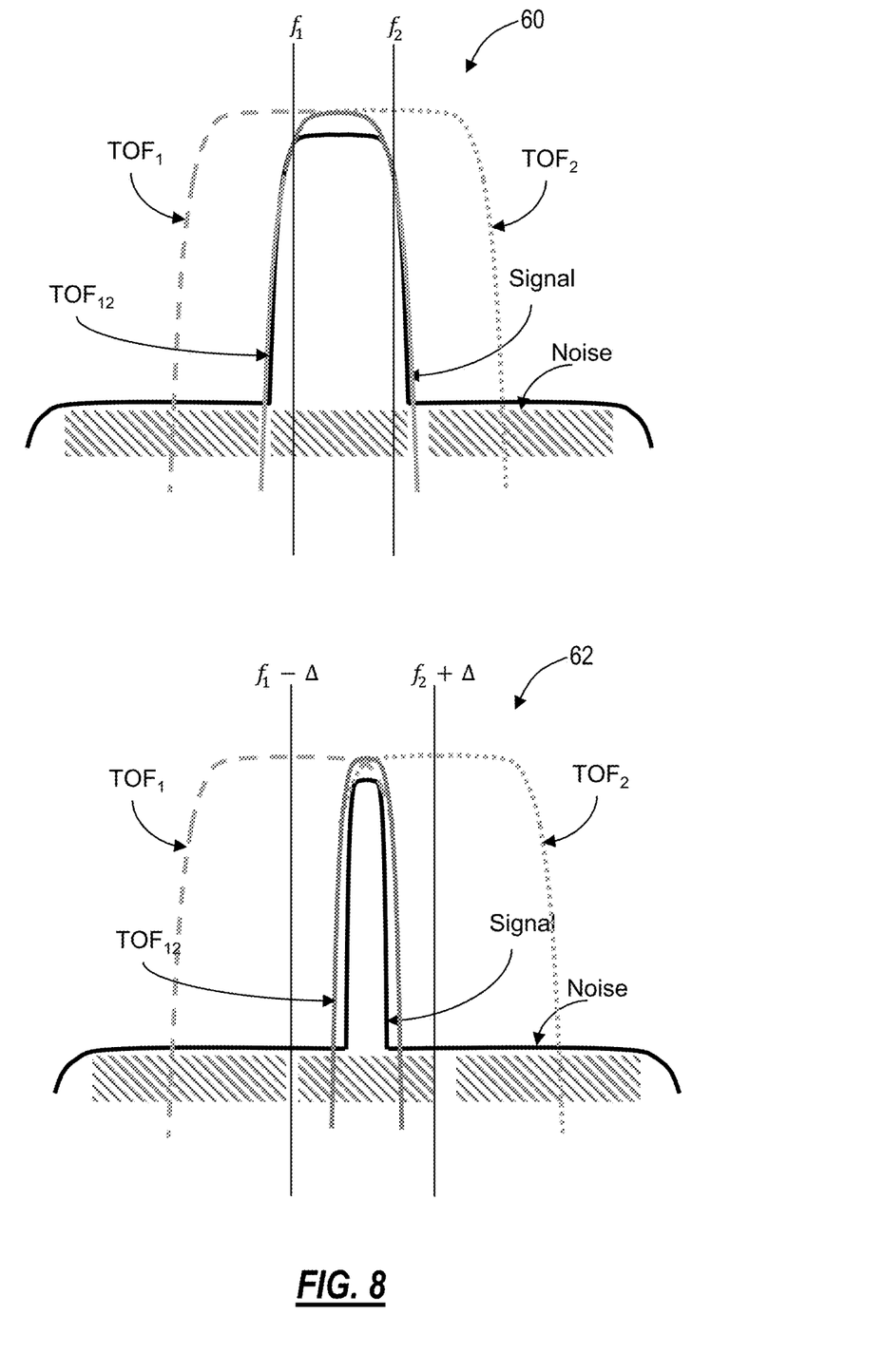
FIG. 8 are plots of signals where $TOF_1$ and $TOF_2$ are centered on frequencies $f_1$ and $f_2$ respectively, and where the TOFs are offset by a delta.

The effective transfer function created by the cascaded TOFs are a bandpass filter where the width is dictated by the frequency offset of $TOF_1$ and $TOF_2$. FIG. 8 illustrates a wideband signal 60 where $TOF_1$ and $TOF_2$ are centered on frequencies $f_1$ and $f_2$ respectively. $f_1$ and $f_2$ are appropriately chosen by a control loop (described below) to minimize the amount of InTOFband noise, minimizing noise funneling. A narrower signal 62 is the same signal reduced in baud, where $f_1$ and $f_2$ are detuned by an offset ($\Delta$) determined by the control loop to narrow the effective bandpass filter and suppress outband noise further.

Filter Response Characteristics

The tunable bandwidth aspect of the cascaded TOF 12-1, 12-2 is achieved by differential frequency offset control of the two TOFs 12-1, 12-2 relative to one another. For high-Q cascaded filters, the flat passband width (P) of the net transmission spectrum is approximately: $P=-2\delta+FWHM$, assuming each of the two TOFs 12-1, 12-2 has the same Full Width at Half Maximum (FWHM), and each TOF is offset by plus or minus δ relative to one another. δ is the passband width of each of the two TOFs 12-1, 12-2.

Figure 9:
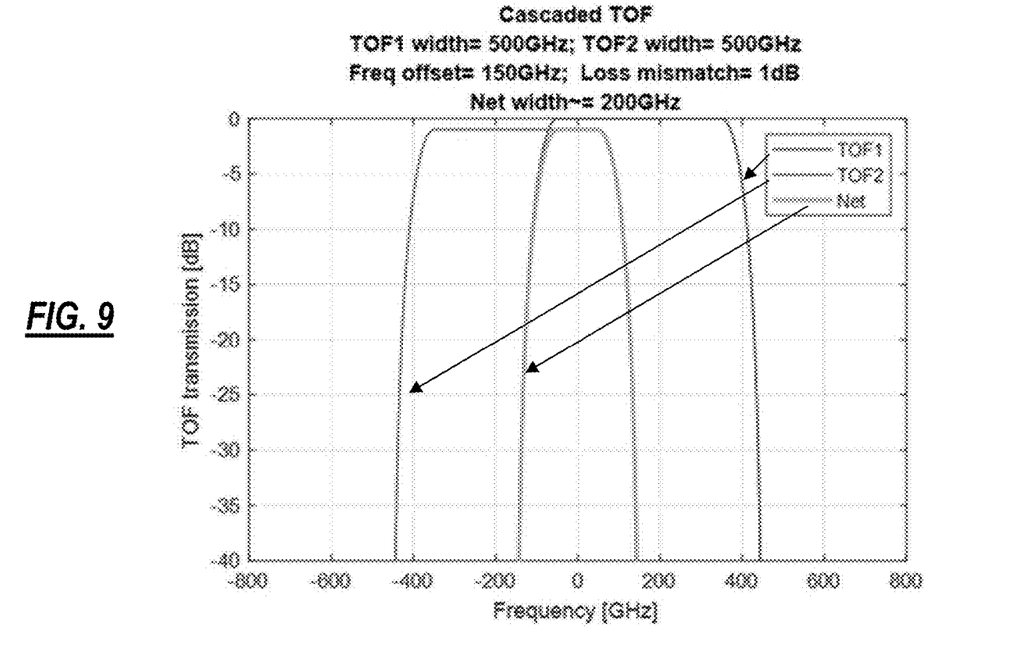
FIGS. 9 and 10 are example plots of raised cosine functions for the TOF shapes.
Figure 10:
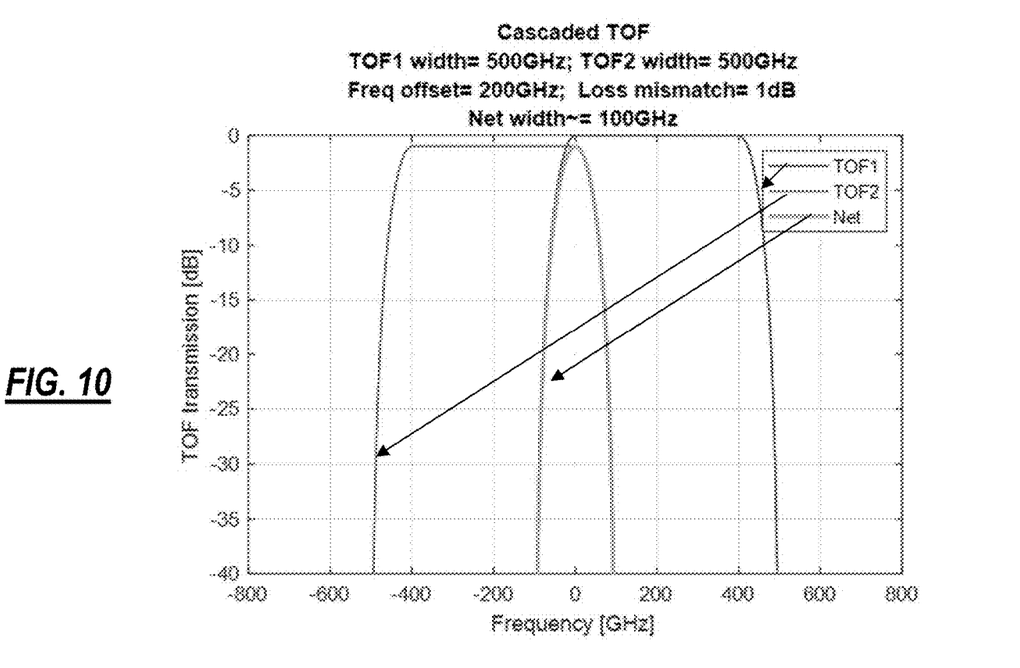

FIGS. 9 and 10 are example plots of raised cosine functions for the TOF shapes. For example signals, with reasonable assumptions for the filter shapes and widths, a FWHM of ~500 GHz and a range of δ from ~150 to ~200 GHz would lead to a range of P from ~200 to ≤100 GHz. An adjustable "insertion loss mismatch" factor is included but does not influence the net width of the transmission function, it results in an additional common mode insertion loss since the two TOFs are in series. Of course, the TOF can include any shaping such as a raised cosine shape and any order Gaussians.

Discrete TOFs 12-1, 12-2 that are cascaded can add an additional 2-3 dB of insertion loss to the Tx chain, however, with or without the EDFA, terminal circuit packs used for multiplexing contain high-Gain EDFA gain blocks capable of compensating for these losses. Thus, the insertion losses for these filters have a mild presence. Also, the TOFs 12-1, 12-2 can include single packaged devices with a single input- and output-fiber coupling points.

Adaptive Centering and Control

Figure 11:
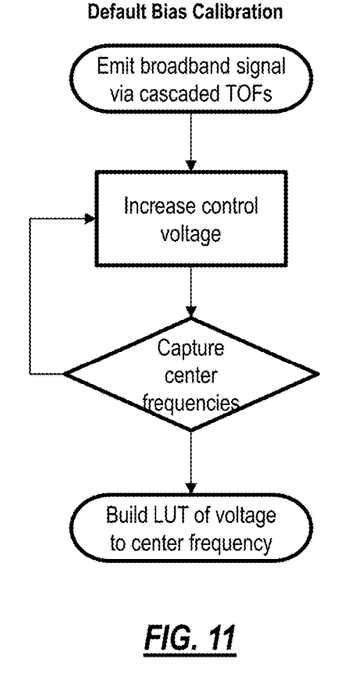
FIG. 11 is a flowchart of a process for default bias calibration.
Figure 12:
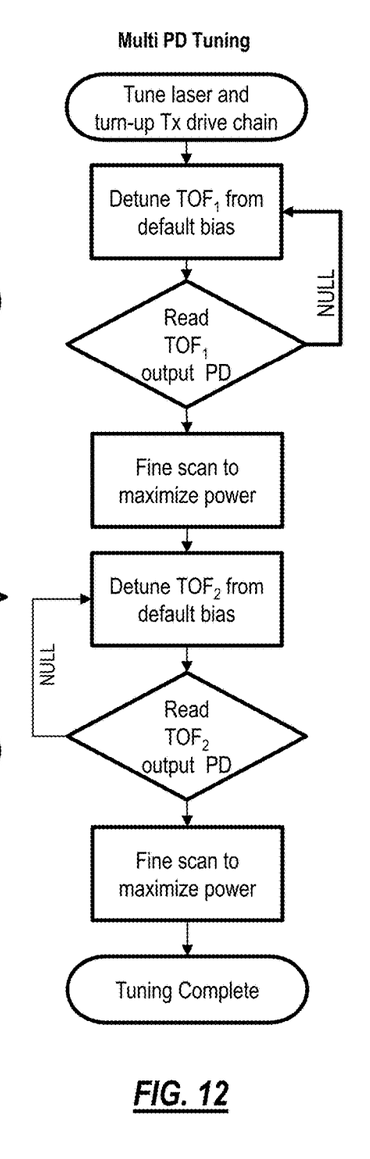
FIG. 12 is a flowchart of a process for multi photodetector (PD) tuning.
Figure 13:
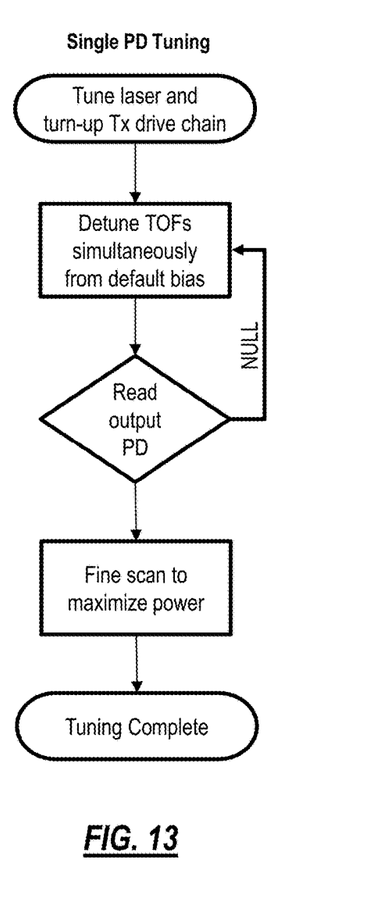
FIG. 13 is a flowchart of a process for single PD tuning.

FIG. 11 is a flowchart of a process for default bias calibration. FIG. 12 is a flowchart of a process for multi photodetector (PD) tuning. FIG. 13 is a flowchart of a process for single PD tuning. The cascaded TOF control system could be based on a total power measurement at the output PD, see FIGS. 5 and 6. Each TOF voltage is biased until the filter edge approaches one side of the modulated spectrum, then finely back tuned. A calibration lookup table (LUT) of TOF center frequency versus TOF control voltage can be established. The LUT would be used to dead-reckon the TOFs to approximately the right center frequency, then a small bias voltage scan to get them optimized. Dynamic implementation of this control system allows the TOF system to adapt to the signal baud and actively suppress out band noise power as a function of transmission mode. Microelectromechanical systems (MEMS) TOFs are highly stable over temperature and ageing hence fixed voltage scans are very accurate. The PD between the two TOFs is an optional feature for accuracy though not a necessity for mission-mode control. Mission-mode optimization of the TOFs are controlled sequentially, based on total output power, the control diagrams for the various scenarios are shown in FIGS. 11, 12, and 13.

Layout

Figure 14:
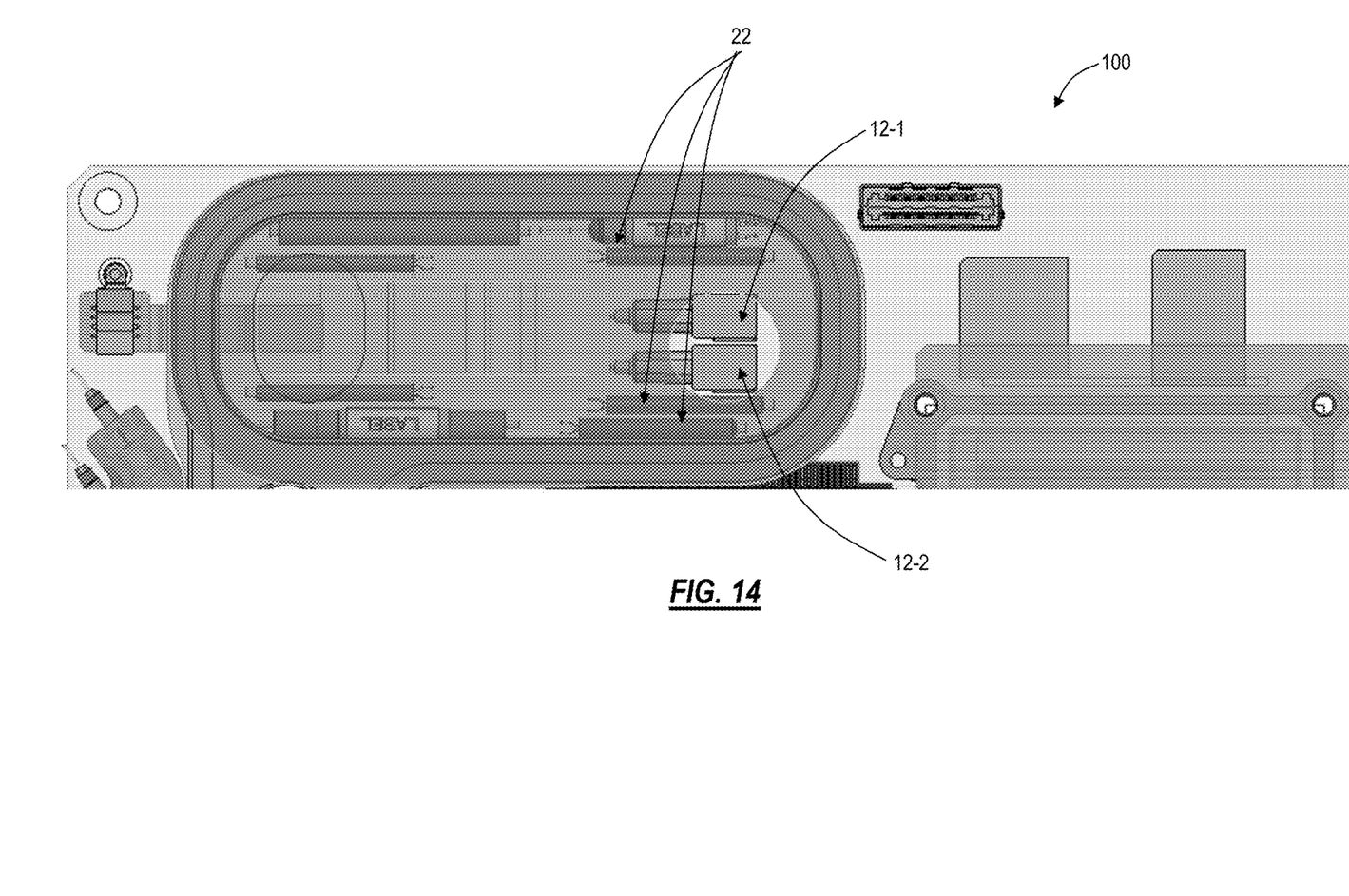
FIG. 14 is a diagram of dense integration of cascaded TOFs and PDs on an electro-optic (EO) printed circuit board (PCB).

FIG. 14 is a diagram of dense integration of cascaded TOFs 12-1, 12-2 and PDs 22 on an electro-optic (EO) printed circuit board (PCB) 100. The PDs 22 and TOFs 12-1, 12-2 can be localized on the PCB 100 or on an electro-optic (EO) daughter board within the PCB. The additional TOF and PD are positioned to minimize the impact on PCB layout/routing, fiber routing and to avoid design/placement changes to the existing components. Spacing the optical components away from the surface of the PCB allow for discrete components to be placed underneath to maximize PCB usable surface area. Again, discrete components is one embodiment, and the present disclosure contemplates an integrated solution as well.

Performance

Figure 15:
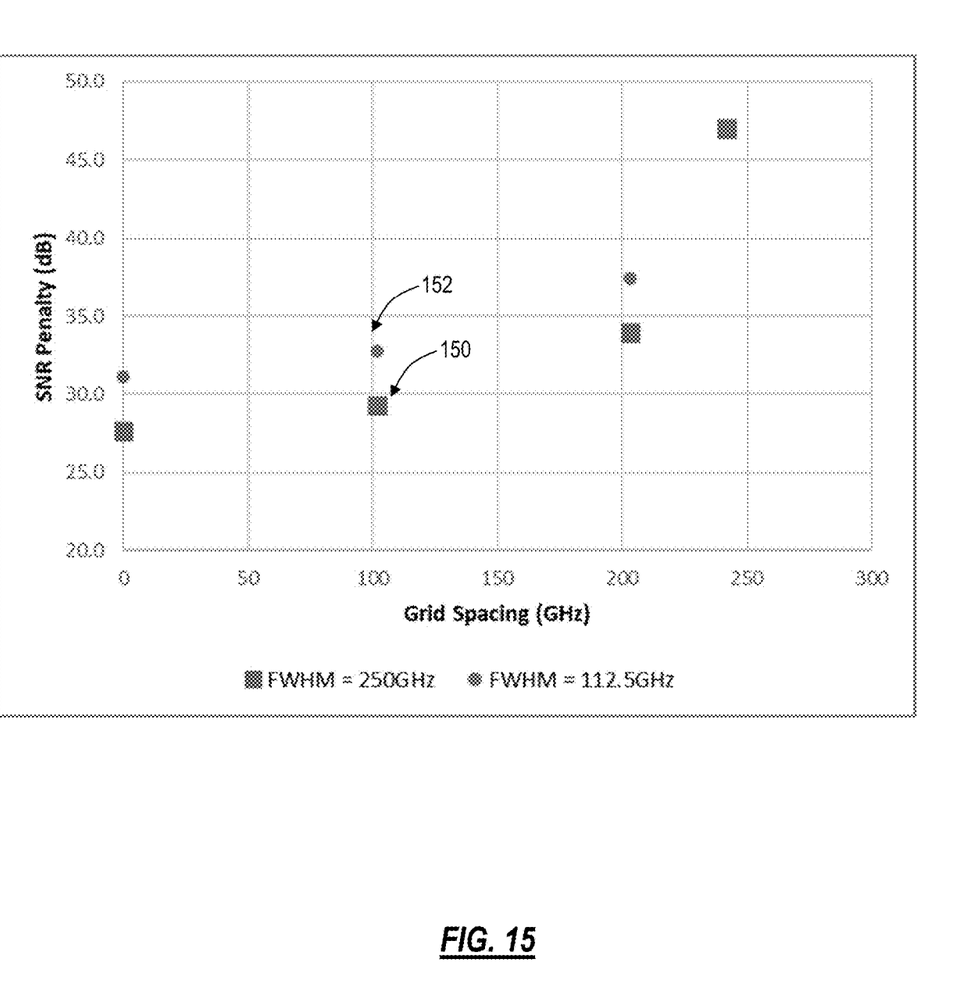
FIG. 15 is a graph of Example SNR penalties from wide TOF versus narrow/cascaded TOF configurations.

Improved OSNR on colorless Tx terminals is the primary performance benefit in the present disclosure. FIG. 15 is a graph of Example SNR penalties from wide TOF versus narrow/cascaded TOF configurations. FIG. 15 demonstrates how a probe's OSNR is affected as its nearest neighbors are separated in frequency. Square markers 150 represent current design operation (single wideband TOF design), while circles 152 indicate how TOF design implemented with bandwidth tunability (through this disclosure and its methodologies) improves the $SNR_{ASE}$ penalty by >3 dB. Tx OSNR benefits of this magnitude can have significant (1-8%) capacity gains on subsea systems.

Figure 16:
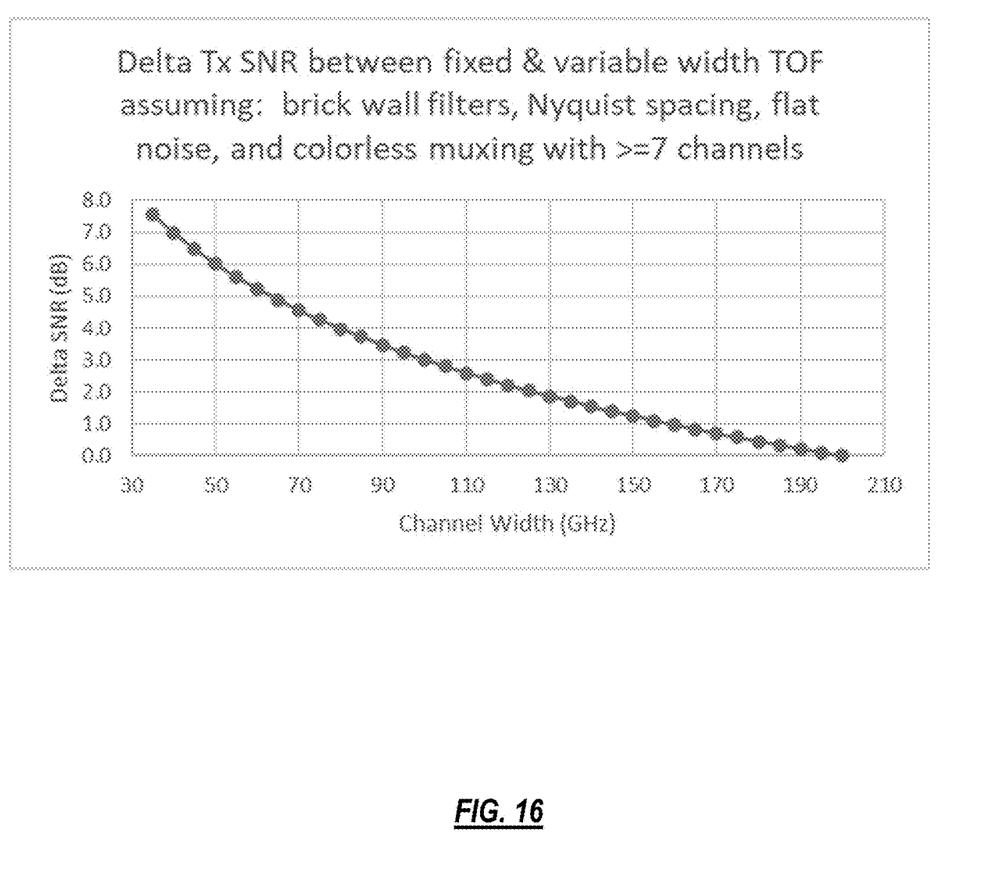
FIG. 16 is a graph of the impact of fixed filter widths on signals with variable baud.

FIG. 16 is a graph of the impact of fixed filter widths on signals with variable baud. Alternatively, the improvement in SNR assuming a fixed filter for an example modem, where the baud is tunable from 35-200GBd is shown in FIG. 16. The system and method for a variable bandwidth TOF as described in this disclosure can provide over 7 dB of improvement in the transmit OSNR. A significant benefit for next generation transponder technologies.

Process

Figure 17:
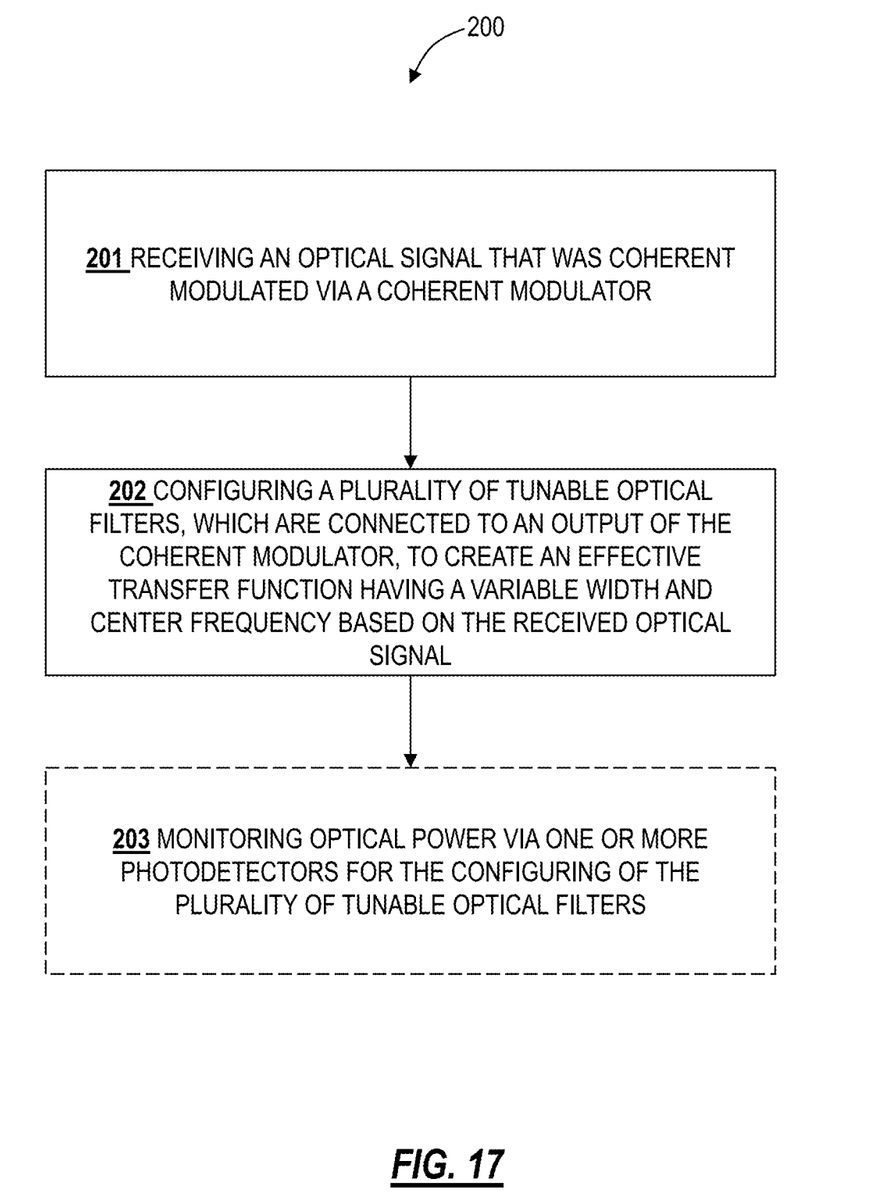
FIG. 17 is a flowchart of a process implemented in a coherent transmitter.

FIG. 17 is a flowchart of a process 200 implemented in a coherent transmitter. The process 200 includes receiving an optical signal that was coherent modulated via a coherent modulator (step 201); and configuring a plurality of tunable optical filters, which are connected to an output of the coherent modulator, to create an effective transfer function having a variable width and center frequency based on the received optical signal (step 202).

The process 200 can further include monitoring optical power via one or more photodetectors for the configuring of the plurality of tunable optical filters (step 203). Each of the plurality of tunable optical filters can include a fixed width and tunable center frequencies for the configuring. The effective transfer function can be based on setting of the tunable center frequencies.

The present disclosure includes a process and apparatus that integrates a customizable tunable optical filter in coherent optical transmitters. The customizations can include but are not limited to, optical filter shaping, filter bandwidth tunability, filter frequency tunability, and adaptive optimizations of filter boundaries. Adaptive optimizations may include self-detection of the signal and noise extent to compress filter bandwidths appropriately for minimization of out of band noise power. The apparatus may be implemented through a composition of cascaded, sequential, or coupled tunable optical filters working in unison to achieve the customizations.

The customizations and implementations can be managed by a control system based on dead reckoning of detected optical powers, via an intermediate photodetector and/or a single output photodetector.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A coherent optical transmitter comprising:
   a coherent modulator;
   a plurality of tunable optical filters, integrated within the coherent optical transmitter, connected to an output of the coherent modulator, wherein each of the plurality of tunable optical filters has a fixed width and a tunable center frequency and wherein the plurality of tunable optical filters are cascaded and configured such that frequency offsets between their tunable center frequencies to create an effective transfer function having a variable width and center frequency; and
   one or more photodetectors configured to monitor the plurality of tunable optical filters, wherein the plurality of tunable optical filters are adaptively controlled such that the variable width and the center frequency is based on signal baud or spectral width of a signal from the output determined based on measurements from the one or more photodetectors, such that the effective transfer function suppresses out-of-band noise and an output of the coherent optical transmitter has corresponding noise pedestals removed prior to any multiplexing.

2. The coherent optical transmitter of claim 1, wherein the plurality of tunable optical filters are cascaded with one another.

3. The coherent optical transmitter of claim 1, wherein the plurality of tunable optical filters are configured together as an integrated device.

4. The coherent optical transmitter of claim 3, wherein the integrated device further includes the coherent modulator.

5. The coherent optical transmitter of claim 1, further comprising an optical amplifier located between the coherent modulator and the plurality of tunable optical filters.

6. The coherent optical transmitter of claim 1, wherein each of the plurality of tunable optical filters includes a fixed width and tunable center frequencies.

7. The coherent optical transmitter of claim 6, wherein the effective transfer function is based on setting of the tunable center frequencies.

8. The coherent optical transmitter of claim 1, wherein a passband of the effective transfer function is based on frequency offsets and Full Width at Half Maximum (FWHM) of the plurality of tunable optical filters.

9. The coherent optical transmitter of claim 1, wherein one or more of the plurality of tunable optical filters has a shape that includes any of a raised cosine shape and any order Gaussians.

10. The coherent optical transmitter of claim 1, wherein one or more of the plurality of tunable optical filters are based on Microelectromechanical systems (MEMS).

11. The coherent optical transmitter of claim 1, wherein the plurality of tunable optical filters are controlled based on total output power.

12. The coherent optical transmitter of claim 1, wherein the plurality of tunable optical filters are controlled sequentially.

13. The coherent optical transmitter of claim 1, wherein the plurality of tunable optical filters are configured based on spectral width of an output signal from the coherent modulator.

14. The coherent optical transmitter of claim 1, further comprising
   circuitry configured to monitor the signal baud of the output based and adjust the effective transfer function based thereon.

15. The coherent optical transmitter of claim 1, wherein the corresponding noise pedestals cause noise funneling in the multiplexing, and wherein the output of the coherent optical transmitter is connected to a multiplexer.

16. A method implemented in a coherent transmitter comprising steps of:
   receiving an optical signal that was coherent modulated via a coherent modulator;
   measuring, via one or more photodetectors, a signal baud or spectral width of an output signal via one or more photodetectors;
   configuring a plurality of tunable optical filters, integrated within the coherent transmitter, which are connected to an output of the coherent modulator, wherein each of the plurality of tunable optical filters has a fixed width and a tunable center frequency, and wherein the plurality of the tunable optical filters are cascaded and configured such that frequency offsets between their tunable center frequencies create an effective transfer function having a variable width and center frequency, and wherein the plurality of tunable optical filters are adaptively controlled based on tthe measured signal baud or spectral width of the received optical signal; and outputting a signal from the coherent transmitter such that the effective transfer function suppresses out-of-band noise and the signal has corresponding noise pedestals removed by the plurality of tunable optical filters, prior to any multiplexing.

17. The method of claim 16, wherein each of the plurality of tunable optical filters includes a fixed width and tunable center frequencies for the configuring.

18. The method of claim 17, wherein the effective transfer function is based on setting of the tunable center frequencies.

19. The method of claim 16, wherein the steps include
amplifying a signal from the coherent modulator and before, in between, or after the plurality of tunable optical filters.

20. The method of claim 16, wherein the measuring includes
dead-reckoning a first tunable optical filter to one side of modulated spectrum of the output signal; and
dead-reckoning a second tunable optical filter to another side of modulated spectrum of the output signal.

* * * * *